US012773621B2

(12) United States Patent
Colenbrander et al.

(10) Patent No.: US 12,773,621 B2
(45) Date of Patent: *Oct. 27, 2026

(54) GAME CONSOLE ENDPOINT MANAGEMENT BRIDGE FOR LOCAL SYSTEM GAME DEVELOPMENT

(71) Applicant: Sony Interactive Entertainment Inc., Tokyo (JP)

(72) Inventors: Roelof Roderick Colenbrander, Costa Mesa, CA (US); Ritu Gupta, Cupertino, CA (US); Maciej Michal Grochowski, Irvine, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 18/433,281

(22) Filed: Feb. 5, 2024

(65) Prior Publication Data

US 2025/0249355 A1 Aug. 7, 2025

(51) Int. Cl.
*A63F 13/34* (2014.01)
*G06F 13/42* (2006.01)

(52) U.S. Cl.
CPC .......... *A63F 13/34* (2014.09); *G06F 13/4221* (2013.01)

(58) Field of Classification Search
CPC ............................ A63F 13/32; A63F 13/3221
See application file for complete search history.

(56) References Cited

U.S. PATENT DOCUMENTS 9,154,451 B2 10/2015 Chernoff et al.
2004/0003297 A1 1/2004 Ma
2007/0130397 A1 * 6/2007 Tsu .................... G06F 13/4022 710/62
2011/0271029 A1 11/2011 Ho

FOREIGN PATENT DOCUMENTS

CN 102662884 A 9/2012
CN 208589013 U 3/2019

OTHER PUBLICATIONS

International Application No. PCT/US2025/014208, International Search Report and Written Opinion, Mailed on May 19, 2025, 8 pages.

* cited by examiner

*Primary Examiner* — Jeffrey K Wong
(74) *Attorney, Agent, or Firm* — Kilpatrick Townsend & Stockton LLP

(57) ABSTRACT

A console compute card for installation in a host system is provided, including: an accelerated processing unit (APU); a Southbridge having a PCIe connection to the APU; an endpoint management bridge (EMB) having a PCIe connection to the Southbridge, the EMB exposing one or more mirrored PCIe endpoints, including one or more local endpoints for enumeration by the APU, and one or more host-facing endpoints for enumeration by the host system; a PCIe edge connector for insertion into a PCIe slot of the host system to form a PCIe connection between the console compute card and the host system; wherein the console compute card includes compute resources substantially similar to compute resources of a retail game console.

20 Claims, 10 Drawing Sheets

GAME CONSOLE ENDPOINT MANAGEMENT BRIDGE FOR LOCAL SYSTEM GAME DEVELOPMENT

CROSS-REFERENCE TO RELATED APPLICATIONS

This application is related to U.S. application Ser. No. 18/433,271, entitled "GAME CONSOLE ENDPOINT MANAGEMENT BRIDGE INTERFACE FOR DATA-CENTER HARDWARE INTEGRATION," filed the same day as the present application, and to U.S. application Ser. No. 18/433,276, entitled "GAME CONSOLE DEVELOPMENT HARDWARE HAVING AN ENDPOINT MANAGEMENT BRIDGE INTERFACE," filed the same day as the present application, and to U.S. application Ser. No. 18/433,285, entitled "METHODS FOR INTEGRATING A GAME CONSOLE CARD TO INTERFACE WITH A HOST SYSTEM," filed the same day as the present application, the disclosures of which are incorporated by reference in their entirety.

BACKGROUND OF THE INVENTION

Modern game consoles, such as the PlayStation(R) 5 video game console, are sophisticated machines capable of providing engaging video game and entertainment experiences. A game console helps to streamline the gaming industry by providing a common platform of standardized resources (e.g. hardware and software) for the development, distribution, and execution of video games. In this manner, game developers can optimize their game development for the game console, and provide consumers with a seamless video game experience devoid of concerns about video game compatibility, optimization or complicated setup with respect to the platform on which the game is run.

A fairly recent development enabled by the proliferation of the Internet is the rise of cloud gaming, in which a video game is executed remotely (e.g. in a remote data center), with gameplay being streamed over the Internet to a user's local client device. More specifically, gaming inputs are transmitted from the client device over the Internet to the cloud executed video game, and the gameplay video generated by the video game is streamed over the Internet to the client device for rendering on a display.

However, while such advantages of the game console ecosystem are afforded for the consumer, because of the proprietary nature of game console hardware, supporting game development can be more complex. The game console must be adapted in various ways to accommodate the needs of game developers, or additional specialized hardware must be created to enable game development. Furthermore, these game development specialized systems are not easily adapted for cloud-based development.

It is in this context that implementations of the disclosure arise.

SUMMARY OF THE INVENTION

Implementations of the present disclosure include methods, systems and devices for providing a game console endpoint management bridge interface for local system game development.

In some implementations, a console compute card for installation in a host system is provided, including: an accelerated processing unit (APU); a Southbridge having a PCIe connection to the APU; an endpoint management bridge (EMB) having a PCIe connection to the Southbridge, the EMB exposing one or more mirrored PCIe endpoints, including one or more local endpoints for enumeration by the APU, and one or more host-facing endpoints for enumeration by the host system; a PCIe edge connector for insertion into a PCIe slot of the host system to form a PCIe connection between the console compute card and the host system; wherein the console compute card includes compute resources substantially similar to compute resources of a retail game console.

In some implementations, the mirrored PCIe endpoints provide separation of a PCIe fabric of the console compute card from a PCIe fabric of the host system, while enabling communication of data between the console compute card and the host system over said PCIe connection between the console compute card and the host system.

In some implementations, the EMB is configured to translate communications occurring between a given local endpoint and a corresponding host-facing endpoint.

In some implementations, the mirrored PCIe endpoints include a local storage endpoint and a host-facing storage endpoint, wherein the local storage endpoint and the host-facing storage endpoint enable the console compute card to access storage of the host system.

In some implementations, the host-facing storage endpoint provides emulation of a storage device that appears as local to the console compute card.

In some implementations, the emulated storage device is an NVMe device.

In some implementations, the mirrored PCIe endpoints include a local peer-to-peer (P2P) endpoint and a host-facing P2P endpoint, wherein the local P2P endpoint and the host-facing P2P endpoint enable data movement between the console compute card and other devices of the host system.

In some implementations, the other devices of the host system include other console compute cards connected to the host system.

In some implementations, the local P2P endpoint and the host-facing P2P endpoint enable video frame capturing by the host system of video rendered by the console compute card.

In some implementations, the console compute card is configured to natively execute one or more console game titles that are configured for execution on the retail game console.

In some implementations, a server computing assembly is provided, including: a server computer, said server computer including a motherboard having at least one PCIe slot; console compute card for installation in the server computer, said console compute card including, an accelerated processing unit (APU), a Southbridge having a PCIe connection to the APU, an endpoint management bridge (EMB) having a PCIe connection to the Southbridge, the EMB exposing one or more mirrored PCIe endpoints, including one or more local endpoints for enumeration by the APU, and one or more host-facing endpoints for enumeration by the server computer, a PCIe edge connector for insertion into a PCIe slot of the host system to form a PCIe connection between the console compute card and the server computer, wherein the console compute card includes compute resources substantially similar to compute resources of a retail game console.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which.

DETAILED DESCRIPTION OF THE INVENTION

In view of the above challenges, implementations of the present disclosure provide a console compute card that includes game console componentry in the form factor of a PCIe (Peripheral Component Interconnect Express) card. The console compute card contains important components of a game console, such as an APU (CPU and GPU), DRAM, Southbridge, etc., but is easily integrated into server or PC systems by virtue of its PCIe card form factor. The console compute card has integrated PCIe switch logic that allows for high-speed low-latency communication with the host system, facilitating operations such as storage virtualization and video capture. In some implementations, an integrated endpoint management bridge provides non-transparent bridging between the internal connection fabric of the console compute card and the PCIe fabric of the host system. The endpoint management bridge facilitates consolidation of connectivity over PCIe, so that various management interfaces and even networking functionalities can be conducted over PCIe. This enables simplified and efficient server design and requires fewer separate connections and cables.

It will be appreciated that while implementations of the present disclosure are generally described in the form of a PCIe card, other implementations may utilize other busses and interconnect form factors such as CXL, AXI, NVLink and others. It will be appreciated that the concepts described herein with reference to PCIe, can be translated to other such interconnects/fabrics. As non-transparent bridging can be used to provide shared memory coherency between a host (e.g. server host) and a console compute card over PCIe, similar functionality can be provided through analogous mechanisms over alternative busses and interconnect fabrics. For example, functionality for shared memory coherency can be natively built-in to the interconnect in some implementations, or can be provided through particular mirrored endpoint implementations similar those described elsewhere herein.

Figure 1:
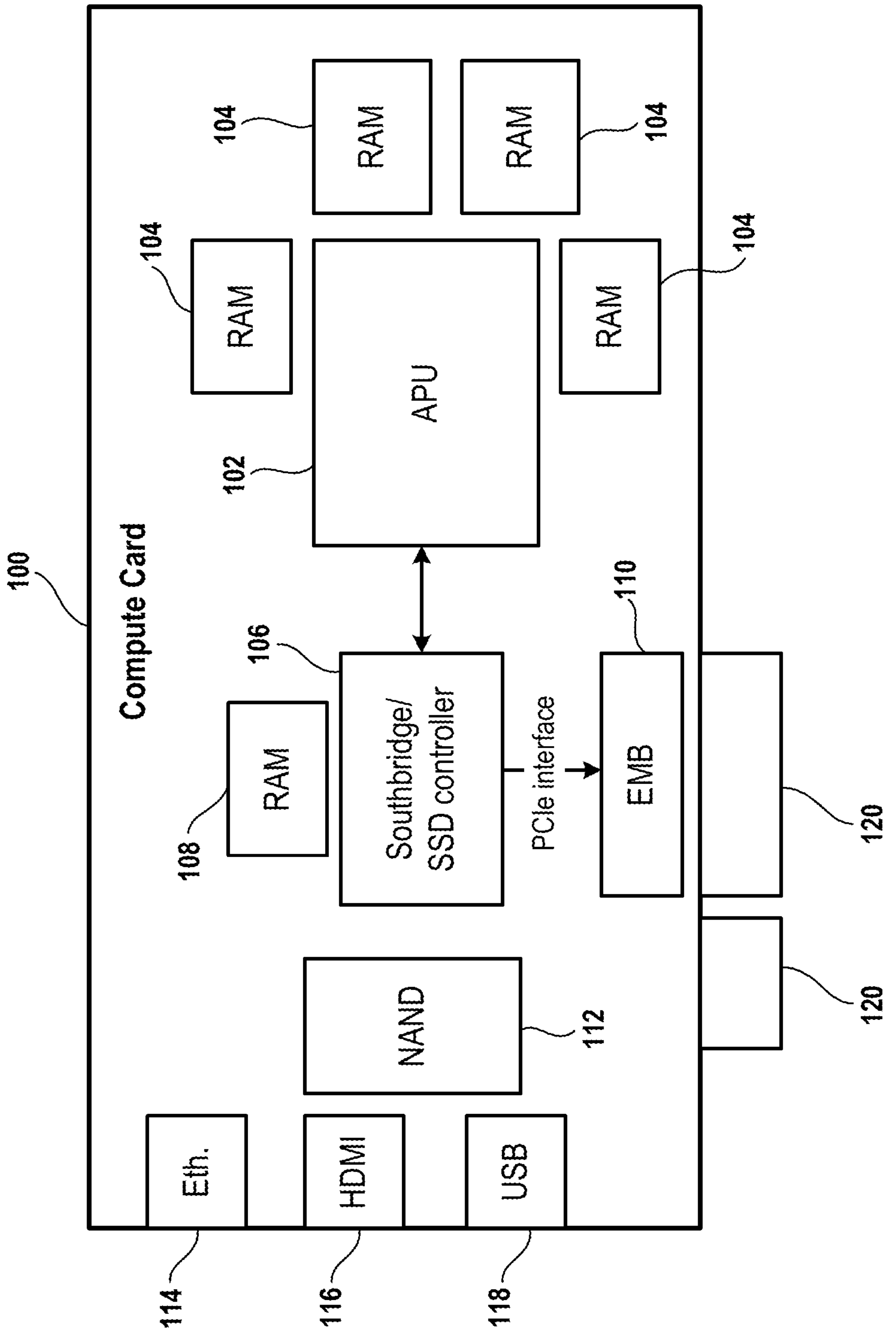
FIG. 1 conceptually illustrates a console compute card, in accordance with implementations of the disclosure.

FIG. 1 conceptually illustrates a console compute card, in accordance with implementations of the disclosure.

A console compute card 100 includes hardware of a game console, but in the form factor of a PCIe card. In the illustrated implementation, the console compute card 100 includes an APU 102 (accelerated processing unit) and associated RAM 104. It will be appreciated that an APU consists of a CPU with an integrated GPU. In alternate implementations, a separate CPU and GPU are included in place of the APU 102 in the console compute card 100. The APU 102 is connected to a Southbridge 106, which provides connection to other componentry of the console compute card 100, and may further include storage controller functionality (e.g. SSD controller functionality). In some implementations, the Southbridge 106 is integrated with the APU 102. The Southbridge 106 may have associated RAM 108. In other implementations, the Southbridge 106 (and its functionality) is integrated with the APU 102.

Optionally, the console compute card 100 includes NAND flash memory 112 (or other non-volatile memory), which can be configured to function as a local SSD, mimicking the setup of a game console in which a separate SSD or hard drive is connected as a peripheral device to the game console's motherboard. The NAND flash memory 112 can be connected to the Southbridge 106, and as noted above, the Southbridge 106 can have integrated SSD controller functionality to manage access and read/write operations to the NAND flash memory 112.

Optionally, the console compute card 100 includes additional ports, such as an Ethernet port 114, an HDMI port 116, and a USB port 118. These can provide additional connectivity/networking options for host system setups.

The Southbridge 106 connects over a PCIe interface to an endpoint management bridge 110 (EMB), whose functionality is described in further detail below. In some implementations, the EMB is integrated into the Southbridge 106, which as noted above, can be integrated with the APU 102.

It will be appreciated that the console compute card 100 includes edge connectors 120 for insertion into a PCIe slot of the host system, forming the physical connection of the console compute card 100 to the PCIe bus of the host system. In alternative implementations, other types of PCIe connection form factors can be used to connect the console compute card 100 to a given host system, such as via an external or cabled PCIe connection.

In some implementations, the console compute card 100 is configured for use in a cloud server environment, such as a cloud gaming server or cloud development server. In other implementations, the console compute card 100 is configured for use in a local computing environment, such as a local workstation, or a local personal computer (PC).

It will be appreciated that in accordance with implementations of the disclosure, the console compute card 100 includes substantially similar or functionally equivalent resources (e.g. hardware, firmware, operating system, virtualization logic, etc.) to that of a retail game console. That is, the console compute card 100 is at least capable of natively executing the same game titles in the same manner as the retail game console is capable of executing. It will be appreciated that a game console is a special purpose computing device representing a closed system for consumer gaming, as video game titles developed to be compatible to run (natively executable) on the game console are generally not executable on other computing devices (unless special emulation software is used to emulate the hardware and operating system environment of the game console). As a game console is a standalone device, it is not easily integrated with other systems or devices. However, by providing the console compute card 100 of the present disclosure with game console-equivalent resources in the form factor of a PCIe card, integration into server systems and other devices becomes more straightforward and additional collaborative functionality is enabled.

Figure 2:
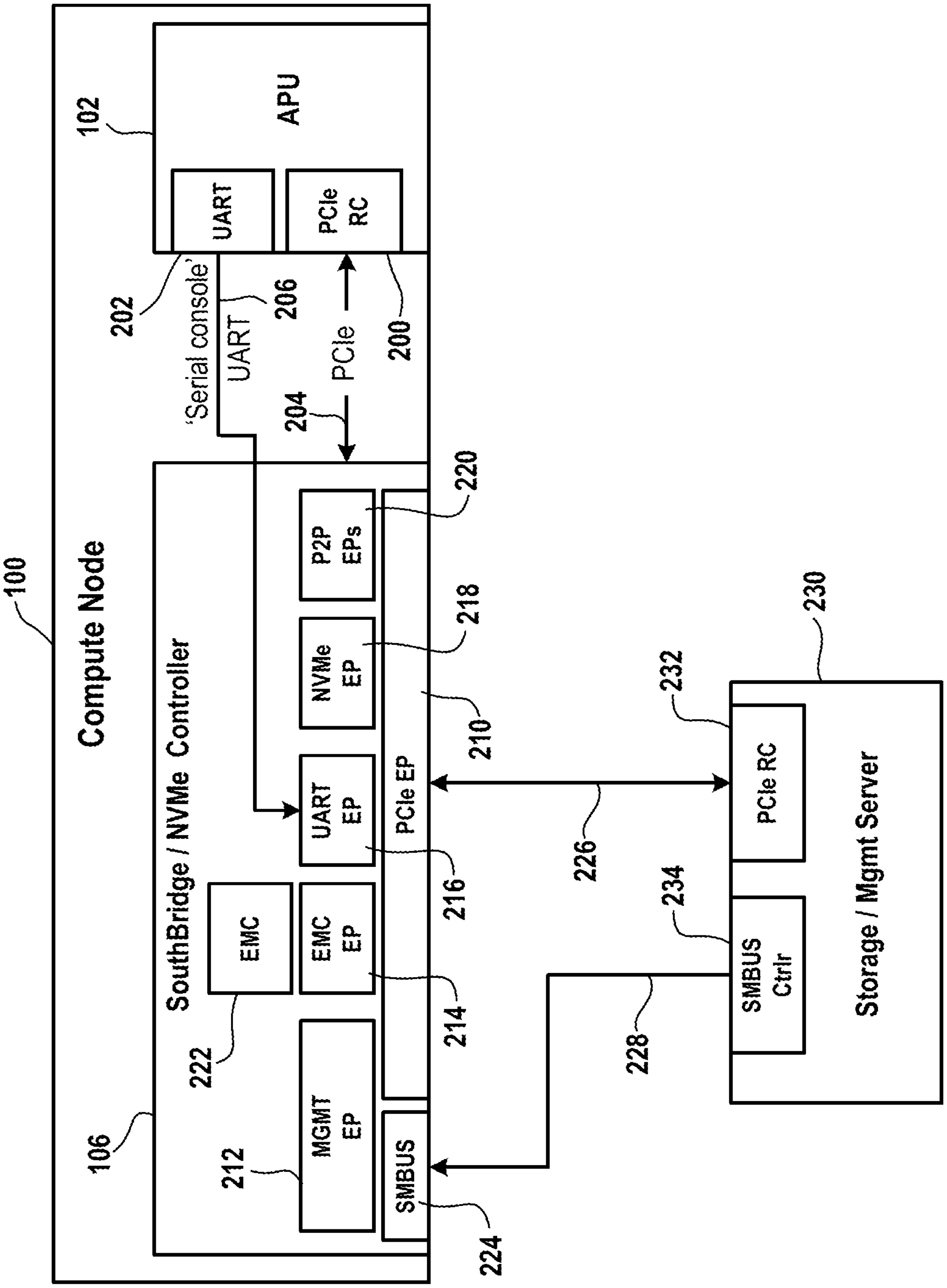
FIG. 2 conceptually illustrates a console compute card 100 including a plurality of endpoints that facilitate interface compatibility with a host system, in accordance with implementations of the disclosure.

FIG. 2 conceptually illustrates a console compute card 100 including a plurality of endpoints that facilitate interface compatibility with a host system, in accordance with implementations of the disclosure.

In the illustrated implementation, the console compute card 100 is shown with its southbridge 106 incorporating the functionality of the aforementioned endpoint management bridge 110. Broadly speaking, in some implementations, most or all of the interfaces to the console compute card 100 are provided over PCIe, with the exception of a sideband interface for recovery or configuration if needed. In some implementations, the console compute card 100 connects over PCIe to a storage or management server 230 (or other host system). More specifically, the PCIe root complex 232 of the management server 230 connects over a PCIe connection 226 to a PCIe endpoint 210 defined in the southbridge 106 of the console compute card 100. In some implementations, the PCIe connection 226 can be in the form of an edge connector of the console compute card 100 mated to a PCIe slot of the management server 230.

In some implementations, the PCIe endpoint 210 is configured to act as a switch or bridge to one or more additional endpoints, such as a management endpoint 212, an EMC endpoint 214, a UART endpoint 216, an NVMe endpoint 218, or a peer-to-peer (P2P) endpoint 220. In other implementations, the PCIe endpoint 210 is configured to enumerate as a multi-function PCIe device, with each of the other endpoints being enumerated as distinct functions of the multi-function device.

In some implementations, a PCIe root complex 200 associated to the APU 102 of the console compute card 100 is configured to facilitate a PCIe connection 204 to the southbridge 106, so that high speed communications over PCIe are facilitated between the APU 102 and the southbridge 106.

In some implementations, a management endpoint 212 is defined to enable management features such as configuration of the Southbridge endpoint, debug, Nandless boot (booting of the compute node without need of NAND on the console compute card 100 for this purpose), firmware update of the Southbridge chip, NVS state management, etc. That is, the management server 230 can access the management endpoint 212 over the PCIe connection 226 to initiate or perform or otherwise manage such activities on the console compute card 100. It will be appreciated that the management endpoint 212 is configured to respond to requests from the management server 230 over the PCIe connection 226 to both carry out requested operations and provide any requested data or confirmations.

In some implementations, an alternative pathway to the management endpoint 212 is provided in the form of an SMBUS sideband interface 224 to the management endpoint 212. This provides redundancy for management purposes in case PCIe connectivity is lost or management of the console compute card 100 is otherwise not possible. It will be appreciated that the PCIe slot configuration can provide for an SMBUS transport pathway, which can be leveraged to provide the sideband interface 224. More specifically, an SMBUS controller 234 of the management server 230 accesses the SMBUS sideband interface 224 over an SMBUS connection 228, with the SMBUS sideband interface 224 in turn accessing the management endpoint 212. By way of example without limitation, such a sideband interface can be useful for performing firmware updates or disaster recovery operations. In some implementations, such a sideband interface 212 can be configured to provide access to control registers (e.g. for reboot/power cycling).

In some implementations, an EMC management interface endpoint 214 is implemented to provide the ability to send commands to the Southbridge. This can be used for control and status information purposes, such as for power on/off/reboot, physical telemetry (e.g. obtaining temperature of the console compute card 100), power status, version information, diagnostics, etc.

In some implementations, one or more UART endpoints 216 are implemented to enable exposure of UART communications over PCIe (e.g. UART communications from the APU). More specifically, in the illustrated implementation, a UART controller 202 associated with the APU 102 may communicate over a UART connection 206 with the UART endpoints 216, and the UART endpoints 216 expose the communications over PCIe to the management server 230. In some implementations, the UART endpoints 216 provide emulation of UART communications for the UART controller 202, while enabling access by the management server 230 over the PCIe connection 226. By way of example without limitation, such UART endpoints can be useful for enabling serial console access through the APU.

In some implementations, an NVMe device endpoint 218 provides efficient emulation of an NVMe drive storage so that the APU 102 (or other component of the console compute card 100) can access the NVMe device endpoint 218 as if it were an actual local NVMe drive/storage device. In some implementations, the NVMe device endpoint 218 enables the console compute card 100 to access storage of the host system while presenting such access in the form of an NVMe device.

In some implementations, peer-to-peer endpoints 220 can be defined to allow for data movement between multiple nodes, including amongst multiple console compute cards installed in a given host system and the host system itself. Such P2P endpoints can be used to enable virtual networking, video frame capturing, or P2P communication between multiple console compute nodes/cards (e.g. for AI workloads, etc.). Generally speaking, the P2P endpoints enable access to the memory address spaces of the console compute cards and the host system, so that data can be moved efficiently amongst the various nodes.

In some implementations, the endpoints are PCIe bus powered so as to stay online regardless of the power status of the console compute card 100. This enables the endpoints to stay online during reboot of the console compute card 100 to avoid PCIe hotplugs/unplugs on the host system (e.g. preserving continuity with storage/management server).

In some implementations, the management/storage server 230 provides centralized non-volatile storage (e.g. NAND/SSD's, hard drives, etc.) for use by console compute cards. It will be appreciated that the non-volatile storage needs of various console compute cards can be consolidated, managed, and serviced by the storage server 230. In this manner, the console compute cards do not need to possess onboard non-volatile storage for purposes such as storing game titles and related data (e.g. executables, assets, etc.), user save data, etc. as these can be handled by the storage server 230.

While a significant role of the storage server 230 is to provide non-local storage for the console compute cards as described, it will be appreciated that the storage server 230 may include various components for performing other functions as well. For example, in some implementations, the storage server 230 can include various accelerators such as (hardware/software) video encoders, GPUs, FPGAs, network adapters or other devices. Video encoders, for example, could provide extra video encoder capacity or provide a way to add the functionality of newer video codecs as they emerge over time. In a cloud gaming context, for example, the storage server may function as a cloud gaming server expected to last 5-10 years, and in that time frame new codecs may emerge. The storage server could be upgraded with newer hardware over time to enable support for such newer codecs to be added after the storage server is placed in service. It will be appreciated that data from the console compute cards can be shared over the PCIe fabric with these cards. This could be done directly or with the help of software (e.g. drivers) on both the storage server and a given console card.

Similarly, in some implementations, the storage server can include a (high-speed) network card, and the enabled high-speed network connectivity of the storage server could be shared over PCIe with the console compute cards. For example, virtual networking could be implemented over the PCIe fabric between the console compute cards and the storage server. This can help to limit the number of cables needed for connection to the console compute cards, and may provide even better performance than a network adapter integrated into the console compute card. Again, as the network card of the storage server can be upgraded over time, so the network connectivity made available to the console compute cards can be improved as well.

It will be appreciated that the console compute cards of the present disclosure can have many use cases within gaming sessions and outside. Within a gaming context, a user experience may span one or more console compute cards. For example, a single player game for a single user may use multiple cards. Or a multiplayer game may span multiple cards on behalf of multiple users.

Other use cases include AI/ML workloads, 3D rendering workloads, generic compute workloads, etc. These can be performed during 'darktime' hours when the hardware is not being used for gaming purposes, and may be repurposed. AI workloads may require multiple cards working together sharing data (e.g. passing results from one card to another or sharing a common data set (e.g. from a storage server)). An AI workload may also be in support of a gaming workload. For example, one console compute card may execute the game session whereas another console compute card may execute an AI workload to provide AI services for the game session. Such use cases may utilize the PCIe fabric for high-speed, low-latency data sharing.

While the EMB 110 is incorporated in the console compute card 100 in various implementations described herein, in alternative implementations, the EMB can be incorporated in a separate standalone device. In some implementations, the EMB is defined in the form factor of a separate adapter card connecting between a host interface (e.g. PCIe) and the Southbridge 106 of the console compute card 100. In some implementations, each console compute card connects through a corresponding standalone EMB adapter card, as each console compute card is provided with similar functionality and management capability enabled by the EMB as described herein. In yet another implementation, a single EMB adapter card is configured to service multiple console compute cards.

Figure 3:
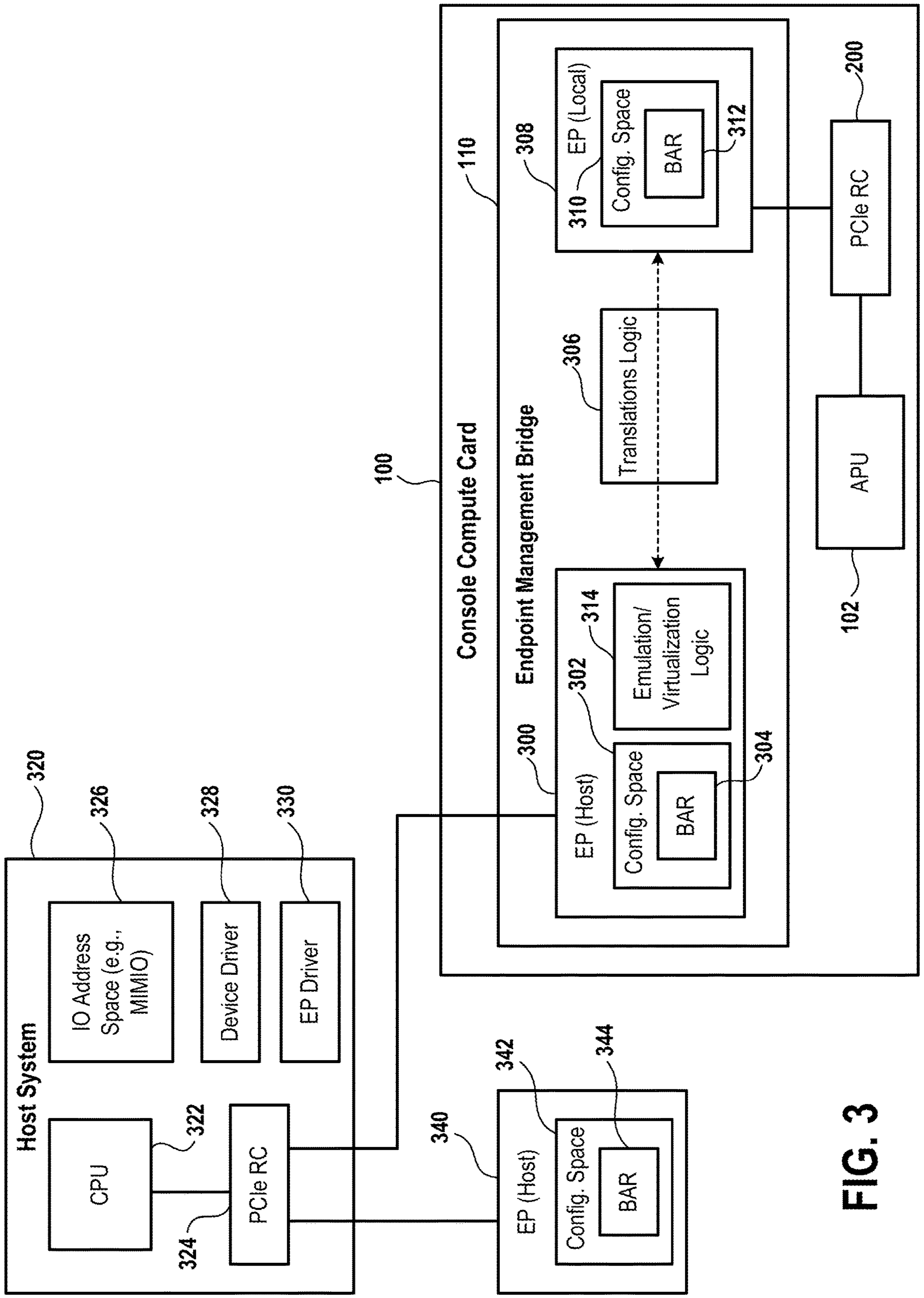
FIG. 3 conceptually illustrates a configuration of mirrored endpoints in an endpoint management bridge, in accordance with implementations of the disclosure.

FIG. 3 conceptually illustrates a configuration of mirrored endpoints in an endpoint management bridge, in accordance with implementations of the disclosure.

In some instances, endpoints of the EMB 110 are mirrored or defined in corresponding pairs, facilitating functionalities associated with the mirrored endpoints to be effected from either side to the other, that is, from a host system to the console compute card 100, or from the console compute card 100 to the host system. In some implementations, this is accomplished by implementing logic for translation of operations between mirrored endpoints.

By implementing endpoints in this way, conflicts that might otherwise arise from having two "host"-type entities interfacing with each other (e.g. the APU of the console compute card 100 and the CPU of the host system) are avoided. The endpoints of each side are independently enumerated, for example, over the respective PCIe fabrics of the console compute card 100 and host system, and separation between the systems is maintained.

Furthermore, the custom endpoints and translation logic of the present implementations enable different interfaces/protocols (including non-PCIe interfaces/protocols) which are native to the console compute card 100 to be effectively accessible over PCIe, so that additional connections for such interfaces are not required as they can be accessed through the PCIe bus of the host system. Thus, console compute I/O functionality does not need to be modified, as the native operating interface conditions are effectively maintained from the standpoint of components of the console compute card 100 that communicate with the EMB 110. Put another way, the endpoints can be configured to emulate interfaces on the console compute side, so that the console compute card 100 can operate the same interfaces internally as the regular game console would operate. This provides consistency of the internal interface operating environment of the console compute card 100, which is important for purposes of providing consistency in game development and execution.

For example, in the illustrated implementation, the console compute card 100 is connected via PCIe to a host system 320. The EMB 110 exposes an endpoint 300 (host-facing or host-enumerated) to the host system 320, such that the endpoint 300 is enumerated by a CPU 322 (or associated PCIe controller) of the host system 320 through an associated PCIe root complex 324 with which the console compute card 100 is interfaced. It will be appreciated that the CPU 322 will enumerate the endpoint 300, but as the endpoint 300 is non-transparent, the CPU 322 will not attempt to discover devices behind the endpoint 300. During enumeration of the endpoint 300, the CPU 322 of the host system 320 may read from a configuration space 302 of the endpoint 300 (e.g. vendor ID, device ID, function, requested memory allocation, etc.), and use this information for setup operations, such as installing a driver 330 for the endpoint 300, and mapping base address registers (BAR) 304 of the endpoint 300 into an IO address space 326 of the host system 320 (e.g. in some implementations, a memory mapped IO (MMIO) configuration is implemented).

On the local side of the console compute card 100, the APU 102 of the console compute card 100 enumerates, through an associated root complex 200, an endpoint 308 (local). Again, it will be appreciated that as the endpoint 308 is non-transparent, the APU 102 will not attempt to discover devices behind the endpoint 308. The endpoint 308 may also have its own configuration space 310 and BAR 312, which can be similarly read/configured as described above, but by the APU 102 of the console compute card 100.

In some implementations, to facilitate operations between the host system 320 and the console compute card 100, translation logic 306 is implemented by the EMB 110 to translate operations between the host-facing endpoint 300 and the local endpoint 308. In some implementations, such translation can take the form of translating between the BAR 304 of the EP 300 and the BAR 312 of the EP 308. For example, translation logic 306 may define a mapping of addresses in BAR 304 to addresses in BAR 312, such as through the application of an offset when translating addresses, or accessing a lookup table defining corresponding addresses, etc.

It will be appreciated that the host system 320 may have additional devices connected thereto, such as a GPU, sound card, network interface card (NIC), storage device, etc. For example, in the illustrated implementation, a device 340 is also connected to the PCIe root complex 324. Accordingly, the device 340 may have a configuration space 342 that is read during enumeration, and BAR 344 that are mapped into the IO address space 326, and a corresponding device driver 328 that is loaded.

In some implementations, communications between the device 340 and the console compute card 100 are enabled. In some implementations, such communications are mediated by the CPU 322, such that requests from a requesting device to a target device, and responses from the target device to the requesting device, are handled by the CPU 322. For example, the CPU 322 may direct requests to the target device's mapped IO address space, and direct responses to the requesting device's mapped IO address space. In other implementations, communications are effected more directly, for example, by implementation in which the requesting and/or target devices are enabled to directly access each other's mapped IO address space through the PCIe fabric of the host system 320. In some implementations, the drivers are configured to inform their respective devices about the other devices, such as their locations, mapped IO address spaces, etc. For example, the endpoint driver 330 may inform the endpoint 300 about the device 340, so that the endpoint 300 may issue requests to the device 340; and the device driver 328 may inform the device 340 about the endpoint 300, so that the device 340 may issue requests to the endpoint 300.

In other implementations, other non-PCIe devices may be connected to the host system 320, and such devices may also be enabled to communicate with the console compute card 100 in accordance with the principles discussed herein.

In some implementations, the endpoint 300 further implements an emulation/virtualization logic 314 that is configured to handle emulation or virtualization of relevant functionality, so that the endpoint 308 is exposed over the PCIe fabric of the console compute card and appears as a regular device in accordance with the accepted interface specification for such a device when connected to or otherwise available to the console compute card 100.

In some implementations, the device 340 is specifically a storage device that is made available for use by the console compute card 100. For example, the endpoint 300 may be enumerated so as to be able to send read/write requests to the device 340, and receive responses to such requests from the device 340. In some implementations, this can entail accessing the mapped IO address space of the device 340 by the endpoint 300, and accessing the mapped IO address space of the endpoint 300 by the device 340. Furthermore, read/write operations are translated by the translation logic 306 across the EMB 110 between the local endpoint 308 and the host-facing (or host-enumerated) endpoint 300. In some implementations, the emulation/virtualization logic 314 is configured to act as a virtual storage device or otherwise emulate a physical storage device that is local/native to the console compute card 100. In this manner, the storage of the device 340 is accessible to the APU 102 or other devices of the console compute card 100 via the endpoint 300, but presented in the form of a local storage device by the local endpoint 308.

While an implementation has been described in which the device 340 is a storage device, it will be appreciated that in other implementations the device 340 can be other types of devices (e.g. GPU, network adapter, video encoder, FPGA, etc.) capable of being configured to communicate with the console compute card 100 in a similar manner. Further, features of the device 340 can be presented in a native context through emulation/virtualization by the local endpoint 308 as has been described.

Figure 4:
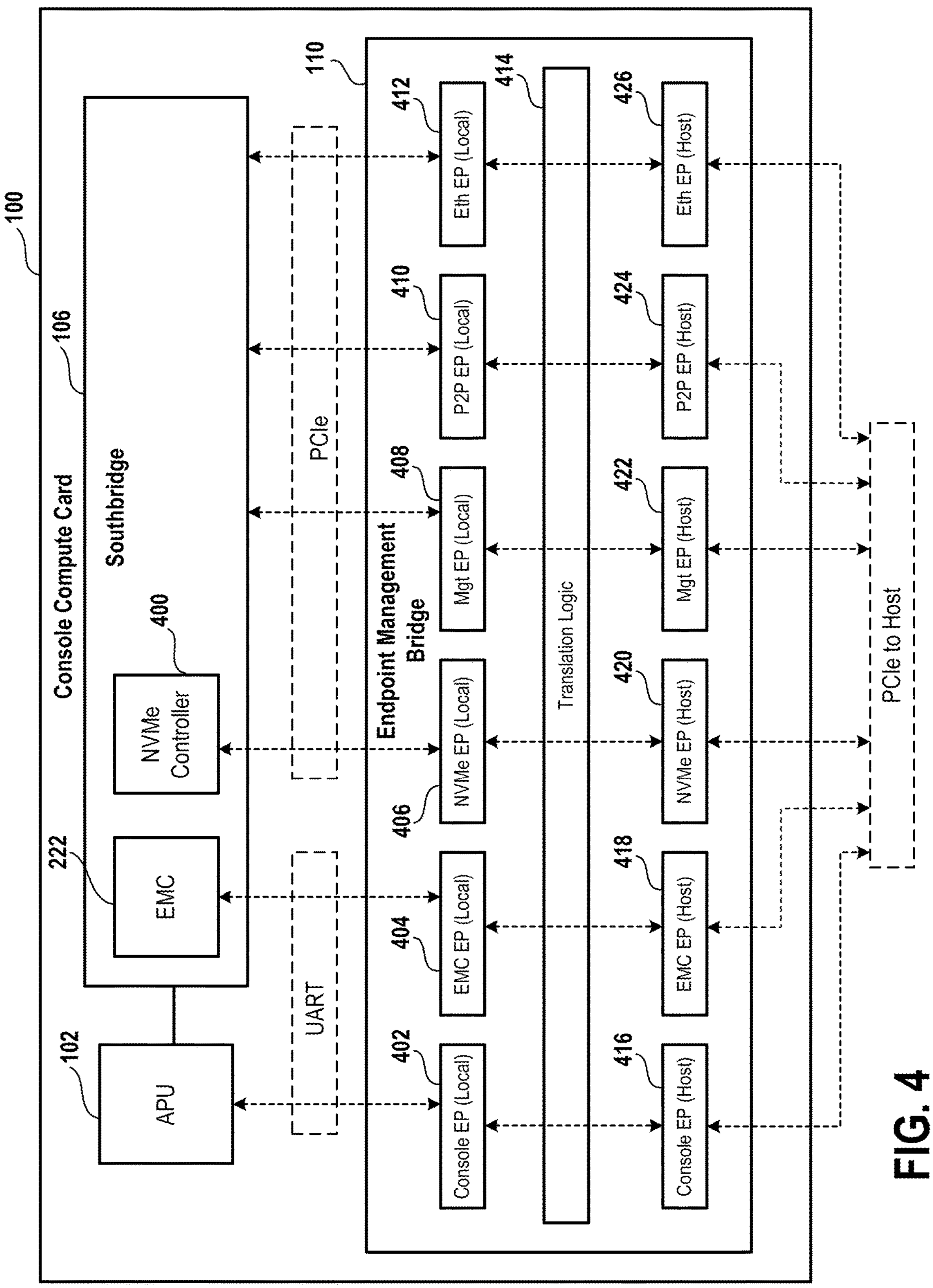
FIG. 4 conceptually illustrates a console compute card 100 having a configuration of mirrored endpoints, in accordance with implementations of the disclosure.

FIG. 4 conceptually illustrates a console compute card 100 having a configuration of mirrored endpoints, in accordance with implementations of the disclosure.

In the illustrated implementation, the console compute card 100 is shown having componentry as has been described. More specifically in the illustrated implementation, the EMB 110 is configured to have a plurality of mirrored endpoints, with each pair of mirrored endpoints including a local endpoint that is enumerated internally by the APU 102 of the console compute card 100 and an external endpoint that is exposed to and enumerated by the host system to which the console compute card 100 is connected via PCIe. Communication with a local endpoint by the APU 102 or another device of the console compute card 100 may occur over PCIe or another communication protocol (e.g. UART), and the local endpoint in some cases provides emulation or virtualization of a device or protocol, so that the internal communications of the console compute card 100, up to the point of the EMB 110, are maintained in their native state (i.e. same as a game console).

Translation logic 414 is implemented to translate operations between the local endpoints and the external endpoints. Various example pairs of mirrored endpoints are described below.

In some implementations, a pair of mirrored endpoints includes a local console endpoint 402 and an external console endpoint 416. In some implementations, the local console endpoint 402 is in communication with the APU 102 via a UART connection. The endpoints 402 and 416 can be configured to enable serial console access to the APU 102, for example, for safemode operation, to obtain console output of the operating system, etc., but effected over the PCIe connection to the host system.

In some implementations, a pair of mirrored endpoints includes a local EMC endpoint 404 and an external EMC endpoint 418. In some implementations, the local EMC endpoint 404 is in communication with the EMC 222 of the Southbridge 106 via a UART connection. The endpoints 404 and 418 can be configured to enable control of the EMC 222, for example, providing the ability to send commands to the Southbridge, power on/off, reboot, status, temperature, power state, version information, diagnostics, etc., but effected over the PCIe connection to the host system.

In some implementations, a pair of mirrored endpoints includes a local NVMe endpoint 406 and an external NVMe endpoint 420. In some implementations, the local NVMe endpoint 404 is in communication with an NVMe controller 400 of the Southbridge 106 via a PCIe connection. The endpoints 406 and 420 can be configured to enable access to host storage, but effected over the PCIe connection to the host system. The host NVMe endpoint 420 may perform emulation so that the compute node simply "sees" an NVMe drive (i.e. NVMe controller communicates with the local NVMe endpoint 406 as if it were an NVMe drive, such that the local NVMe endpoint 406 behaves like a regular device, exposing the state emulated by the host NVMe endpoint 420 into the local NVMe endpoint 406 which is visible to the NVMe controller 400).

As described, the console-facing endpoint appears like a 'real' device and emulation of storage can be handled by the 'mirrrored' host/external facing endpoint in conjunction with software layers (e.g. drivers) and potentially hardware. For example, storage drivers in the host system may process storage requests and pass them to physical NVMe drives in the host. In some implementations, a physical storage device (e.g. a physical NVMe drive) can be exclusive to a specific console compute card and any requests would map one-to-one and may directly go to the drive.

In some implementations, a pair of mirrored endpoints includes a local management endpoint 408 and an external management endpoint 422. In some implementations, the local management endpoint 408 is in communication with the Southbridge 106 via a PCIe connection. The endpoints 408 and 422 can be configured to enable various management operations, such as configuration of the Southbridge, debug, NANDless boot, firmware update of the Southbridge, NVS state management, etc., but effected over the PCIe connection to the host system.

In some implementations, a pair of mirrored endpoints includes a local peer-to-peer (P2P) endpoint 410 and an external P2P endpoint 424. In some implementations, the local P2P endpoint 410 is in communication with the Southbridge 106 via a PCIe connection. The endpoints 410 and 424 can be configured to enable data movement between multiple console compute cards when attached to the same host, such as for virtual networking, video frame capturing, communication between multiple compute nodes, etc., but effected over the PCIe fabric of the host system.

In some implementations, a pair of mirrored endpoints includes a local Ethernet endpoint 412 and an external Ethernet endpoint 426. In some implementations, the local Ethernet endpoint 412 is in communication with the Southbridge 106 via a PCIe connection. The endpoints 412 and 426 can be configured to enable Ethernet communications, but effected over the PCIe connection to the host system. In some implementations, the host Ethernet endpoint 426 is configured to emulate the functionality of a network interface card (NIC), similar to that which would be present in a game console. The internal Ethernet endpoint 412 can appear to the console compute card to be a 'real' network interface, exposing the state emulated by the external Ethernet endpoint 426. In some implementations, the external Ethernet endpoint 426 is configured to access a network connection of the host system, through which console compute card 100 may gain access to a network, which may include the Internet. In some implementations, the emulated network device might be entirely implemented in software (providing a pure virtual network between the console compute card and the host system over PCIe) or in another implementation, the host could bridge the network to an actual network interface. As with the storage endpoints described above, emulation of a networking device can be handled by the 'mirrrored' host/external facing endpoint in conjunction with software layers (e.g. drivers) and potentially hardware. For example, drivers in the host system may process network requests and pass them to physical networking devices (e.g. NICs) in the host system. In some implementations, the physical networking device (e.g. NIC) is exclusive to a console compute card and any requests would map one-to-one and may directly go to the networking device.

Figure 5:
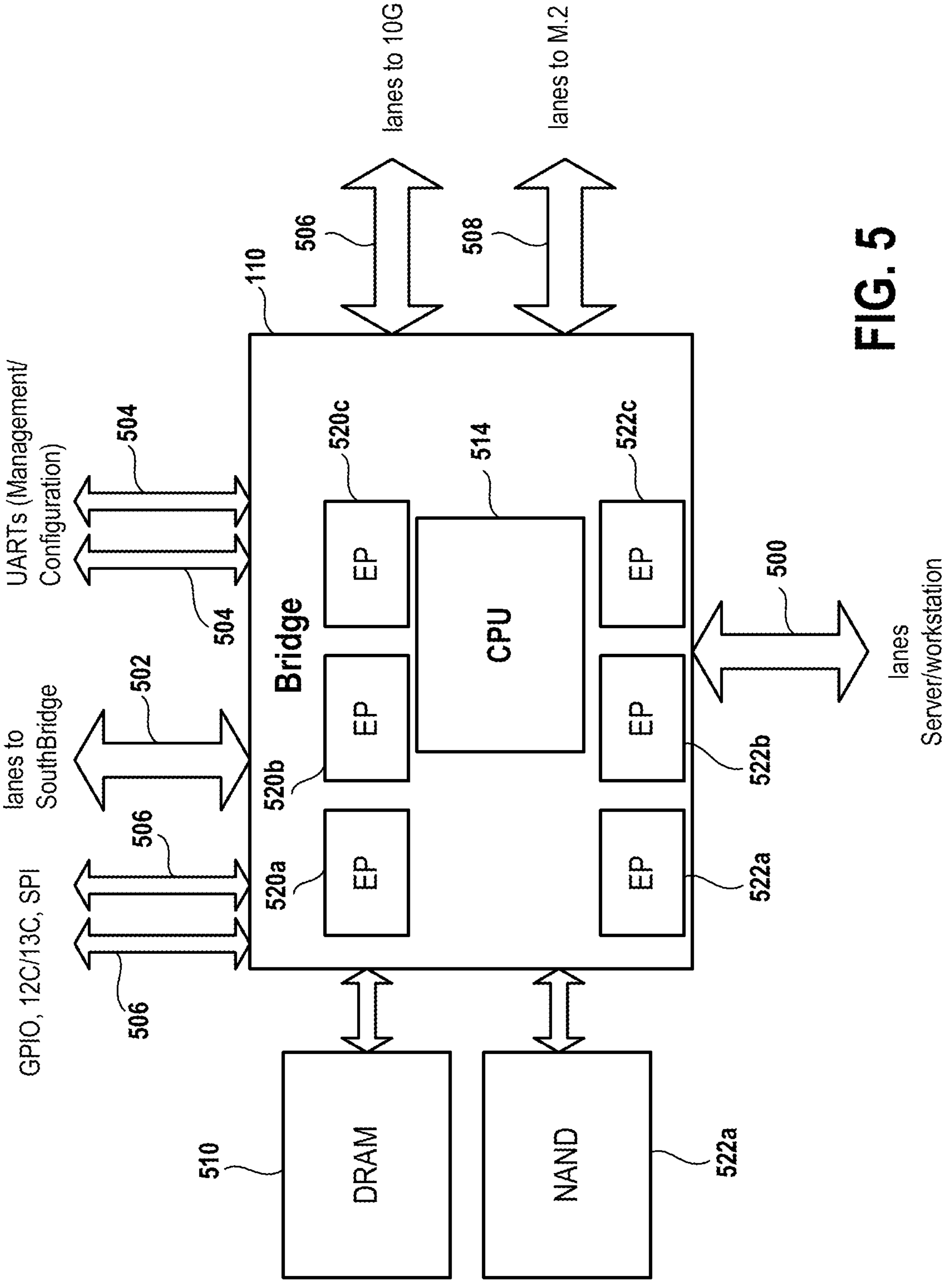
FIG. 5 conceptually illustrates functionality of the endpoint management bridge 110, in accordance with implementations of the disclosure.

FIG. 5 conceptually illustrates functionality of the endpoint management bridge 110, in accordance with implementations of the disclosure.

The endpoint management bridge (EMB) 110 provides a non-transparent bridging functionality between the console compute card 100 and the host system in which the card is disposed. The EMB 110 enables the console compute card 100 to interface with the PCIe fabric of the host system while maintaining separation of the communications fabric of the console compute card 100 (which can itself include a PCIe fabric). Furthermore, the EMB 110 enables other communications protocols to be virtualized over PCIe, so that most if not all communication with the console compute card 100 is effected over PCIe, thereby simplifying connectivity to the console compute card 100.

In the illustrated implementation, the EMB 110 is configured to have an external connection 500 over PCIe to the host system (e.g. server/workstation).

Optionally, the EMB 110 is configured to have additional internal connections to onboard devices over PCIe. For example, an internal connection 506 is provided over PCIe to networking hardware of the console compute card (e.g. 10G NIC). Optionally, the EMB 110 is configured to have an external connection 508 over PCIe to an M.2 storage device of the console compute card. In some implementations, in order to provide sufficient PCIe lanes to support such connections, the EMB 110 can include a PCIe switch (not shown).

The EMB 110 is further configured to have an internal connection 502 over PCIe (internal PCIe fabric of the console compute card 100) to the Southbridge 106 of the console compute card 100. Optionally, the EMB 110 is configured to have one or more internal connections 504 facilitating communication over UART. Optionally, the EMB 110 is configured to have one or more internal connections 506 facilitating communication over other protocols, such as GPIO, I2C/I3C, SPI, etc.

In some implementations, the EMB 110 is connected to DRAM 510 and/or NAND 512, providing volatile and/or non-volatile storage for access by the EMB 110.

The EMB 110 includes a CPU 514 that provides management of console operations such as power on/off, reboot, diagnostics, firmware updates, debug, etc. The CPU may also handle configuration of endpoints, which are described below.

In further implementations, the CPU 514, DRAM 510, NAND 512, and/or at least some of their functionality, can be externally provided (e.g. via the PCIe connection to the console compute card or another connection).

The EMB 110 further includes a plurality of endpoints that define destination targets for communications originating from within the console compute card 100, or from other entities such as the host system in which the console compute card 100 is disposed, other PCIe devices connected to the host system, other devices networked to the host system (e.g. networked storage device), etc. As described, in some implementations, the endpoints are one-sided in the sense that they are defined to be visible to either the entities within the console compute card 100 that communicate with the EMB 110, or those of the host system that communicate with the EMB 110, but not both. Thus, some endpoints are internally facing endpoints exposed to the internal communications fabric of the console compute card 100 (but not the communications fabric of the host system), while other endpoints are externally facing endpoints and exposed to the communications fabric of the host system (but not the internal communications fabric of the console compute card 100). In the illustrated implementation, endpoints 520*a*, 520*b*, and 520*c* are internally facing endpoints, accessed by componentry of the console compute card 100 in communication with the EMB 110, but not accessible by the host system. Whereas, endpoints 522*a*, 522*b*, and 522*c* are externally facing endpoints accessed by the host system, but not accessible by the internal components of the console compute card 100.

As noted, in some instances, endpoints are mirrored or defined in corresponding pairs, so that functionalities associated with the mirrored endpoints can be effected from either side to the other, that is, from the host system to the console compute card 100, or from the console compute card 100 to the host system. This can be further accomplished by implementing logic for translation of operations between mirrored endpoints. This avoids conflicts that might otherwise arise from having two "host"-type entities interfacing with each other (e.g. the APU of the console compute card 100 and the CPU of the host system). The endpoints of each side are independently enumerated, for example, over the respective PCIe fabrics of the console compute card 100 and host system, and separation between the systems is maintained. In the illustrated implementation, the APU 102 of the console compute card 100 enumerates the endpoints 520*a*, 520*b*, and 520*c*, whereas the CPU of the host system enumerates the endpoints 522*a*, 522*b*, and 522*c*.

Figure 6:
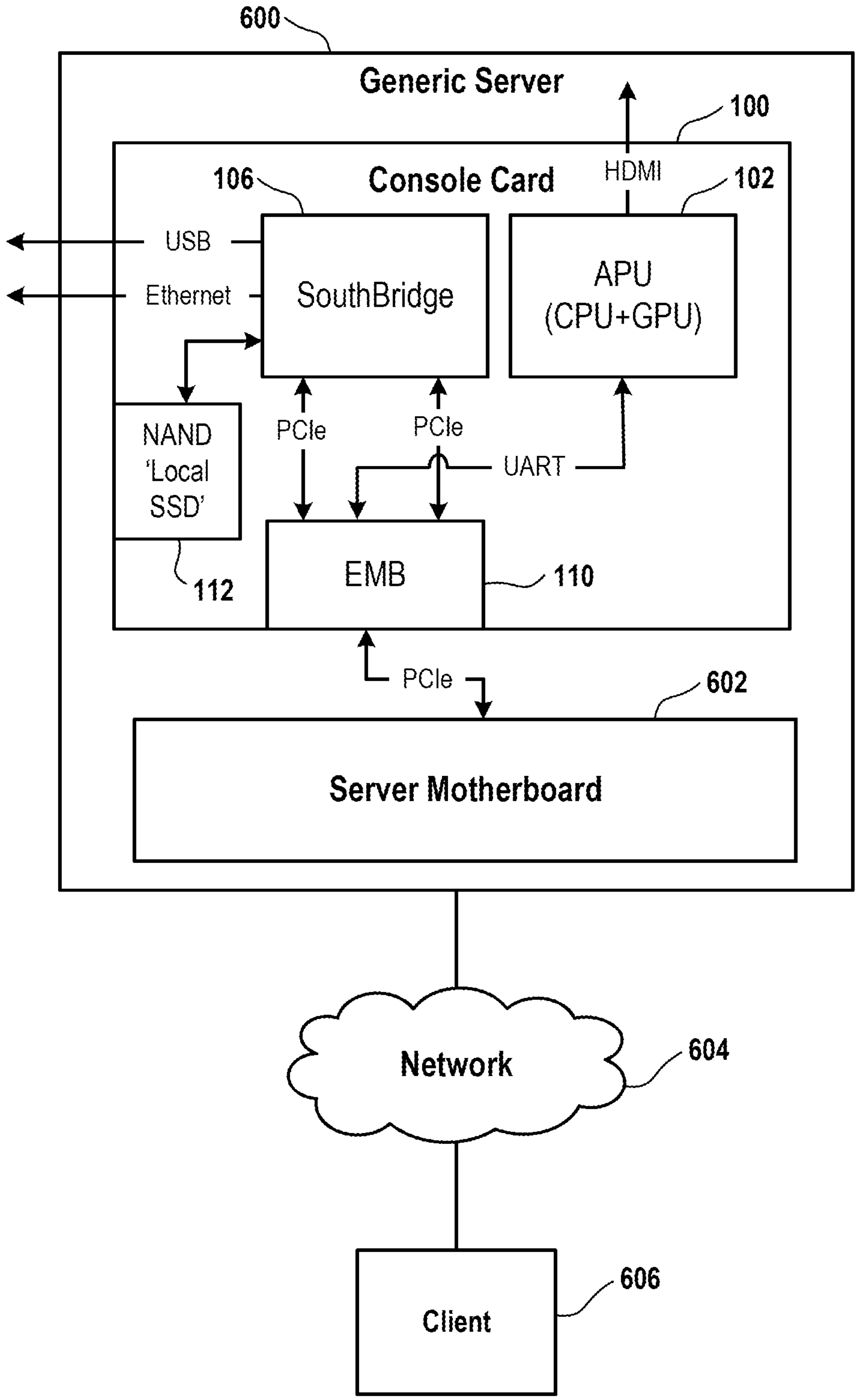
FIG. 6 conceptually illustrates a devkit server host system having a console compute card, in accordance with implementations of the disclosure.

FIG. 6 conceptually illustrates a devkit server host system having a console compute card, in accordance with implementations of the disclosure.

In some implementations, the console compute card 100 can be used as a building block for a devkit server for game development. Such a devkit server can be used for game development in the cloud, which can be a private cloud (e.g. AWS, etc.) in some implementations. In some implementations, such a devkit server can be used in developer data centers, offices, or other locations accessible over a network.

Accordingly, in the illustrated implementation, the console compute card 100 is disposed in a devkit server system 600, which acts as the host system for the console compute card 100. More specifically, the console compute card 100 is connected to a server motherboard 602 via PCIe (e.g. inserted into PCIe slot on the motherboard 602). In some implementations, the console compute card 100 includes a local SSD storage 112. In some implementations, the console compute card 100 supports external connections such as HDMI, USB, Ethernet, etc. For example, in some implementations, video rendered by the GPU portion of the APU 102 may be output over HDMI. In some implementations, data communications involving the Southbridge 106 may be carried out over a USB connection or over an Ethernet connection to an external device.

The server system 600 is connected to a network 604 including the Internet. A client device 606 is also connected to network 604, and communicates with the server system 600 over network 604. In this setup, a user may operate client device 606 and remotely access the server system 600 over network 604 to carry out game development operations. It will be appreciated that the high-speed PCIe connection to the server motherboard 602 can be used to enable various functionalities including virtual storage, network connectivity, video capture, etc.

Figure 7:
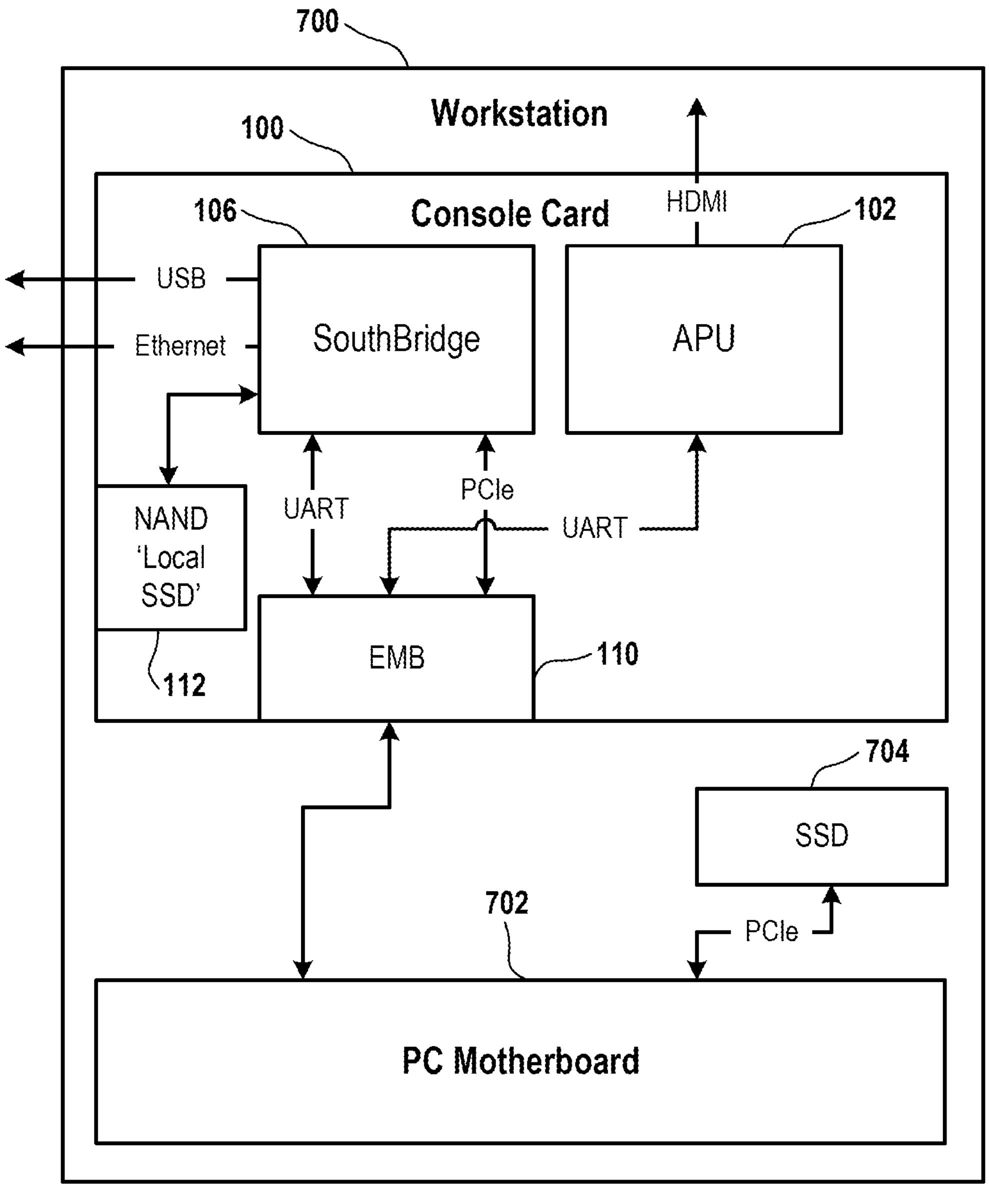
FIG. 7 conceptually illustrates a workstation devkit host system incorporating a console compute card, in accordance with implementations of the disclosure.

FIG. 7 conceptually illustrates a workstation devkit host system incorporating a console compute card, in accordance with implementations of the disclosure.

In the illustrated implementation, the console compute card 100 is integrated into a workstation 700, which acts as the host system for the console compute card 100. More specifically, the console compute card 100 is connected to a PC motherboard 702 via PCIe (e.g. inserted into PCIe slot on the motherboard 702). In some implementations, the console compute card 100 includes a local SSD storage 112. In some implementations, the console compute card 100 supports external connections such as HDMI, USB, Ethernet, etc. For example, in some implementations, video rendered by the GPU portion of the APU 102 may be output over HDMI. In some implementations, data communications involving the Southbridge 106 may be carried out over a USB connection or over an Ethernet connection to an external device.

In some implementations, the workstation 700 further includes an SSD 704 that may be connected to the motherboard 702 via PCIe. The SSD 704 can be made accessible for use by the console compute card 100 through storage virtualization mediated by the EMB 110 as previously described.

By providing the console compute card 100 as a PCIe card that slots into the motherboard 702 in the workstation 700, the high-throughput PCIe fabric can be leveraged for communications with the console compute card 100 for game development. For example, high-speed virtual networking to the console compute card 100 can be enabled, for example, for fast game uploads. Furthermore, sharing of workstation storage, such as that of the SSD 704 in the illustrated implementation, can be enabled over PCIe. In some implementations, video capturing is facilitated, such that rendered video frames are captured by the workstation, for example, using P2P endpoints as described above for data transfer.

As shown, the console compute card 100 may include a local SSD 112. In some implementations, the local SSD is configured to have the same performance characteristics as that of the regular game console. In this manner, game development can occur using storage that will be indicative of the final game behavior on the regular game console.

Additionally, it will be appreciated that by providing the console compute card 100 for integration into a workstation for game developers, the console compute card 100 will be hidden from view within the workstation computer, providing security against theft or unwanted discovery.

By providing the console compute card 100 in the form factor of a PCIe card, different usages across developer workstations and servers are enabled. High-speed storage sharing between a workstation/server computer and a console compute card 100 can be enabled over PCIe. High-speed data sharing over PCIe between a workstation/server computer and console compute card 100 for other purposes can be enabled, such as for video capture. A fully integrated workflow for game development can be realized, as the console compute card 100 can be directly integrated into the workstation/server computer. Artificial intelligence (AI)/ machine learning (ML) benefits can be realized as a developer can integrate logic of the workstation/server computer with that of the console compute card 100. Also, the console compute card 100 can be used as the basis for servers for office environments. For example, the console compute card 100 can be integrated into build servers, thereby making the process of developing, generating, and deploying builds for testing more efficient.

Figure 8:
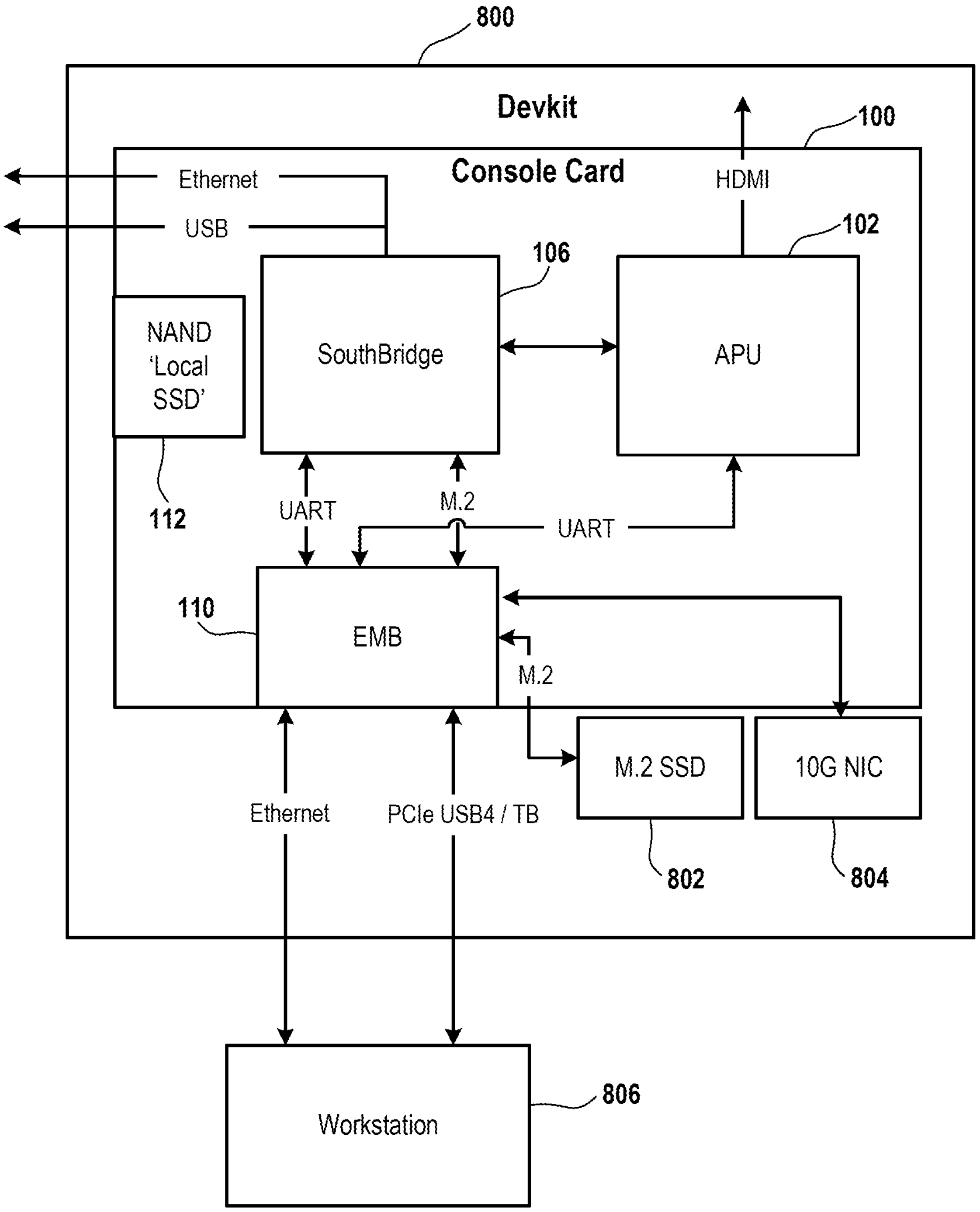
FIG. 8 conceptually illustrates a standalone devkit incorporating a console compute card, in accordance with implementations of the disclosure.

FIG. 8 conceptually illustrates a standalone devkit incorporating a console compute card, in accordance with implementations of the disclosure.

In the illustrated implementation, the devkit 800 is configured as a standalone portable unit, and therefore has a housing in which componentry is disposed. In some implementations, the housing serves as a chassis to which the internal components are mounted. As shown in the illustrated implementation, the devkit 800 includes the console compute card 100 in a configuration supporting connections to other components both internally and externally.

Broadly speaking, the devkit 800 is configured to be used by developers to develop video games and related software, as well as for testing early debug builds of video games. Accordingly, the devkit 800 is configured to support high-speed connectivity to a workstation 806 through one or more interface types, such as over PCIe, USB4 or Thunderbolt. More specifically, in some implementations, the devkit 800 is configured to enable a PCIe connection between the EMB 110 and the workstation 806. In some implementations, the devkit 800 is configured to enable a USB4 or Thunderbolt connection between the EMB 110 and the workstation 806. In some implementations, the devkit 800 is configured to support an Ethernet connection between the EMB 110 and the workstation 806. It will be appreciated that the devkit 800 can be configured to include the requisite ports and/or cabling to support such high-speed connectivity between the console compute card 100 and the workstation 806.

In some implementations, the devkit 800 is configured to provide extra hardware and software (compared to the regular retail game console) to support developer activities. For example, in some implementations, extra RAM is provided in the console compute card 100 in the devkit 800. In some implementations, the console compute card 100 is configured with M.2 drive support to enable extra storage capability. For example, such extra storage can take the form of an additional M.2 SSD 802, which may connect to the EMB 110. In some implementations, high-speed Ethernet (e.g. 10G) connectivity is supported, for example, through connection of the EMB 110 to a NIC 804 (e.g. supporting 10G Ethernet).

In some implementations, additional development features and capabilities are implemented by the console compute card 100, such as debug, profiler, remote storage capability, etc. In some implementations, remote control of the console compute card 100 (e.g. via the workstation 806) is enabled through a central processor of the console compute card 100, such as the CPU of the EMB 110 described above.

In some implementations, the local SSD 112 is utilized for game and OS storage. In some implementations, the console compute card 100 is configured to enable remote storage to be accessed through the workstation 806.

In some implementations, the devkit 800 and/or the console compute card 100 are configured to provide various additional interfaces useful for game development, such as Ethernet, HDMI, USB, WiFi, etc. It will be appreciated that the devkit 800 can include one or more appropriate ports to enable such interfaces.

In some implementations, the devkit 800 includes a dedicated power supply to provide power to the console compute card 100 and other components of the devkit 800.

Figure 9A:
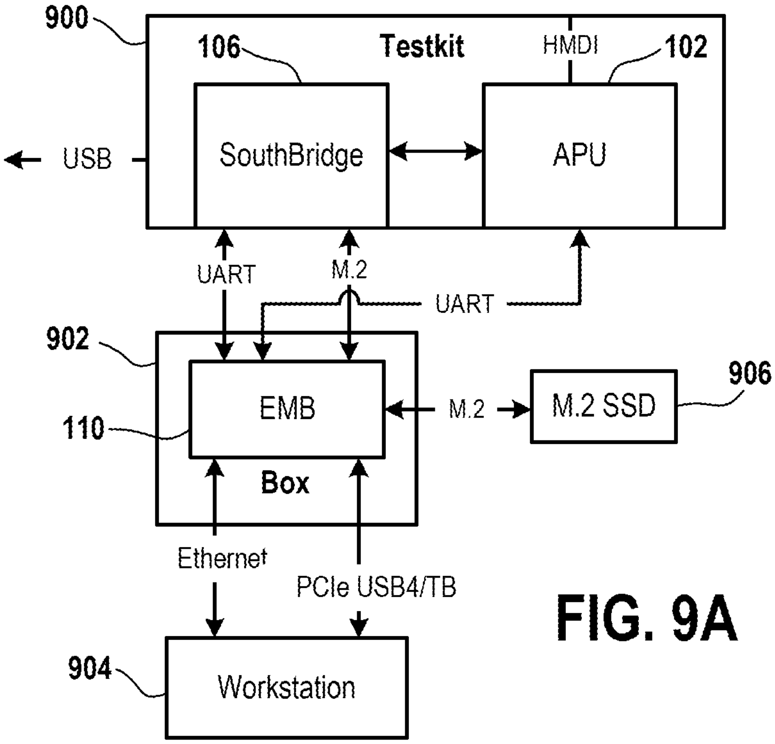
FIGS. 9A and 9B conceptually illustrate implementations of a testkit and bridge device, in accordance with implementations of the disclosure.
Figure 9B:
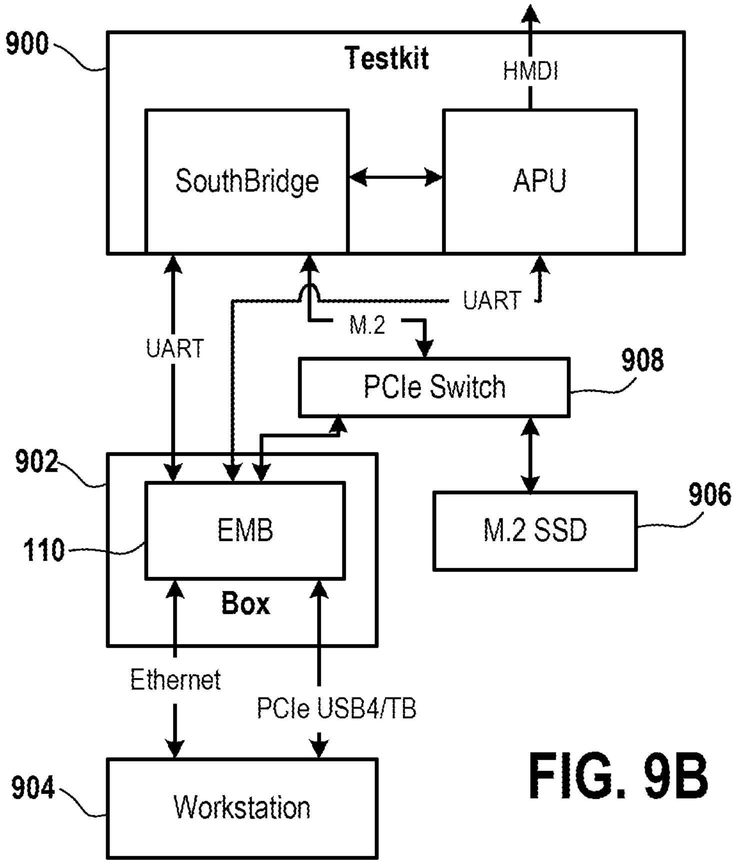

FIGS. 9A and 9B conceptually illustrate implementations of a testkit and bridge device, in accordance with implementations of the disclosure.

A testkit 900 is used by quality assurance (QA) testers for final validation of games on retail-equivalent hardware. That is, the testkit 900 includes the retail game console motherboard, so that QA can be assured their test build is being executed on the actual retail hardware that a player would operate. As shown, the testkit 900 includes the APU 102 and Southbridge 106.

However, in these implementations, a separate bridge box device 902 is defined to include an embodiment of the endpoint management bridge 110, which can be leveraged to provide control processing functionality of the testkit 900. The bridge box device 902 is configured to serve as an interface between the testkit 900 and a workstation 904, enabling additional features for debug and testing through its hardware and software configuration. In some implementations, the bridge box device 902 is configured to provide one or more UART connections to the testkit 900, which can be configured for communication between the EMB 110, and the Southbridge 106 and/or the APU 102.

In some implementations, the bridge box device 902 is configured to connect to the workstation 904 via a PCIe or USB4 or Thunderbolt connection. In some implementations, the bridge box device 902 is configured to connect to the workstation 904 via an Ethernet connection, which can be leveraged to provide additional Ethernet connectivity to the testkit 900.

In some implementations, the CPU of the EMB 110 in the bridge box device 902 provides remote control of the testkit 900, such as for power on/off/reboot, serial console access, etc.

In some implementations, an M.2 SSD 906 is provided for additional storage. In the implementation of FIG. 9A, the EMB 110 of the bridge box device 902 is configured to have an M.2 port to support an M.2 connection to the SSD 906, while also supporting an M.2 connection to the Southbridge 106 of the testkit 900.

In an alternative implementation of FIG. 9B, a separate PCIe switch 908 is provided. The PCIe switch 908 is configured to provide an M.2 port to support an M.2 connection to the SSD 906. The PCIe switch 908 is connected to the EMB 110 of the bridge box device 902, and also supports an M.2 connection to the Southbridge 106 of the testkit 900.

Figure 10:
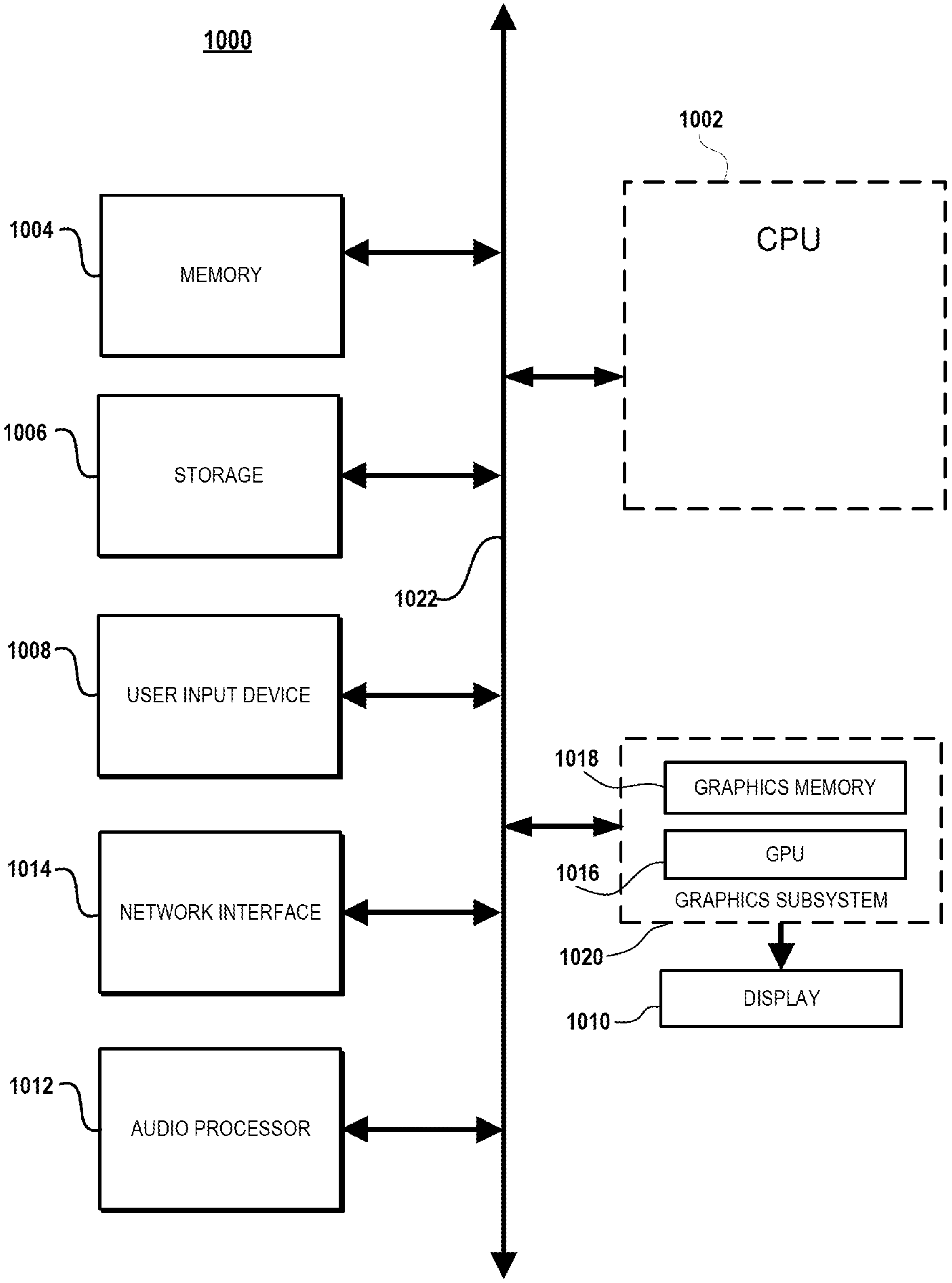
FIG. 10 illustrates components of an example device 1000 that can be used to perform aspects of the various embodiments of the present disclosure.

FIG. 10 illustrates components of an example device 1000 that can be used to perform aspects of the various embodiments of the present disclosure. This block diagram illustrates a device 1000 that can incorporate or can be a personal computer, video game console, personal digital assistant, a server or other digital device, suitable for practicing an embodiment of the disclosure. Device 1000 includes a central processing unit (CPU) 1002 for running software applications and optionally an operating system. CPU 1002 may be comprised of one or more homogeneous or heterogeneous processing cores. For example, CPU 1002 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1000 may be a localized to a player playing a game segment (e.g., game console), or remote from the player (e.g., back-end server processor), or one of many servers using virtualization in a game cloud system for remote streaming of gameplay to clients.

Memory 1004 stores applications and data for use by the CPU 1002. Storage 1006 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1008 communicate user inputs from one or more users to device 1000, examples of which may include keyboards, mice, joysticks, touch pads, touch screens, still or video recorders/cameras, tracking devices for recognizing gestures, and/or microphones. Network interface 1014 allows device 1000 to communicate with other computer systems via an electronic communications network, and may include wired or wireless communication over local area networks and wide area networks such as the internet. An audio processor 1012 is adapted to generate analog or digital audio output from instructions and/or data provided by the CPU 1002, memory 1004, and/or storage 1006. The components of device 1000, including CPU 1002, memory 1004, data storage 1006, user input devices 1008, network interface 1010, and audio processor 1012 are connected via one or more data buses 1022.

A graphics subsystem 1020 is further connected with data bus 1022 and the components of the device 1000. The graphics subsystem 1020 includes a graphics processing unit (GPU) 1016 and graphics memory 1018. Graphics memory 1018 includes a display memory (e.g., a frame buffer) used for storing pixel data for each pixel of an output image. Graphics memory 1018 can be integrated in the same device as GPU 1008, connected as a separate device with GPU 1016, and/or implemented within memory 1004. Pixel data can be provided to graphics memory 1018 directly from the CPU 1002. Alternatively, CPU 1002 provides the GPU 1016 with data and/or instructions defining the desired output images, from which the GPU 1016 generates the pixel data of one or more output images. The data and/or instructions defining the desired output images can be stored in memory 1004 and/or graphics memory 1018. In an embodiment, the GPU 1016 includes 3D rendering capabilities for generating pixel data for output images from instructions and data defining the geometry, lighting, shading, texturing, motion, and/or camera parameters for a scene. The GPU 1016 can further include one or more programmable execution units capable of executing shader programs.

The graphics subsystem 1014 periodically outputs pixel data for an image from graphics memory 1018 to be displayed on display device 1010. Display device 1010 can be any device capable of displaying visual information in response to a signal from the device 1000, including CRT, LCD, plasma, and OLED displays. Device 1000 can provide the display device 1010 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A console compute card for installation in a host system, comprising:
- an accelerated processing unit (APU);
- a Southbridge having a PCIe connection to the APU;
- an endpoint management bridge (EMB) having a PCIe connection to the Southbridge, the EMB exposing one or more mirrored PCIe endpoints, including one or more local endpoints for enumeration by the APU, and one or more host-facing endpoints for enumeration by the host system; and
- a PCIe edge connector for insertion into a PCIe slot of the host system to form a PCIe connection between the console compute card and the host system;
- wherein the console compute card includes compute resources similar to compute resources of a retail game console.

2. The console compute card of claim 1, wherein the one or more mirrored PCIe endpoints provide separation of a PCIe fabric of the console compute card from a PCIe fabric of the host system, while enabling communication of data between the console compute card and the host system over the PCIe connection between the console compute card and the host system.

3. The console compute card of claim 1, wherein the EMB is configured to translate communications occurring between a given local endpoint and a corresponding host-facing endpoint.

4. The console compute card of claim 1, wherein the one or more mirrored PCIe endpoints include a local storage endpoint and a host-facing storage endpoint, wherein the local storage endpoint and the host-facing storage endpoint enable the console compute card to access storage of the host system.

5. The console compute card of claim 4, wherein the host-facing storage endpoint provides emulation of a storage device that appears as local to the console compute card.

6. The console compute card of claim 5, wherein the storage device is an NVMe device.

7. The console compute card of claim 1, wherein the one or more mirrored PCIe endpoints include a local peer-to-peer (P2P) endpoint and a host-facing P2P endpoint, wherein the local P2P endpoint and the host-facing P2P endpoint enable data movement between the console compute card and other devices of the host system.

8. The console compute card of claim 7, wherein the other devices of the host system include other console compute cards connected to the host system.

9. The console compute card of claim 7, wherein the local P2P endpoint and the host-facing P2P endpoint enable video frame capturing by the host system of video rendered by the console compute card.

10. The console compute card of claim 1, wherein the console compute card is configured to natively execute one or more console game titles that are configured for execution on the retail game console.

11. A server computing assembly, comprising:

a server computer, the server computer including a motherboard having at least one PCIe slot;

console compute card for installation in the server computer, the console compute card including, an accelerated processing unit (APU), a Southbridge having a PCIe connection to the APU, an endpoint management bridge (EMB) having a PCIe connection to the Southbridge, the EMB exposing one or more mirrored PCIe endpoints, including one or more local endpoints for enumeration by the APU, and one or more host-facing endpoints for enumeration by the server computer, and a PCIe edge connector for insertion into a PCIe slot of a host system to form a PCIe connection between the console compute card and the server computer, wherein the console compute card includes compute resources similar to compute resources of a retail game console.

12. The server computing assembly of claim 11, wherein the one or more mirrored PCIe endpoints provide separation of a PCIe fabric of the console compute card from a PCIe fabric of the server computer, while enabling communication of data between the console compute card and the server computer over the PCIe connection between the console compute card and the server computer.

13. The server computing assembly of claim 11, wherein the EMB is configured to translate communications occurring between a given local endpoint and a corresponding host-facing endpoint.

14. The server computing assembly of claim 11, wherein the one or more mirrored PCIe endpoints include a local storage endpoint and a host-facing storage endpoint, wherein the local storage endpoint and the host-facing storage endpoint enable the console compute card to access storage of the server computer.

15. The server computing assembly of claim 14, wherein the host-facing storage endpoint provides emulation of a storage device that appears as local to the console compute card.

16. The server computing assembly of claim 15, wherein the storage device is an NVMe device.

17. The server computing assembly of claim 11, wherein the one or more mirrored PCIe endpoints include a local peer-to-peer (P2P) endpoint and a host-facing P2P endpoint, wherein the local P2P endpoint and the host-facing P2P endpoint enable data movement between the console compute card and other devices of the server computer.

18. The server computing assembly of claim 17, wherein the other devices of the server computer include other console compute cards connected to the server computer.

19. The server computing assembly of claim 17, wherein the local P2P endpoint and the host-facing P2P endpoint enable video frame capturing by the server computer of video rendered by the console compute card.

20. The server computing assembly of claim 11, wherein the console compute card is configured to natively execute one or more console game titles that are configured for execution on the retail game console.

* * * * *